Dec. 8, 1931.  W. F. OBERHUBER  1,835,238
CONDENSER SLUG
Filed March 10, 1930  2 Sheets-Sheet 1
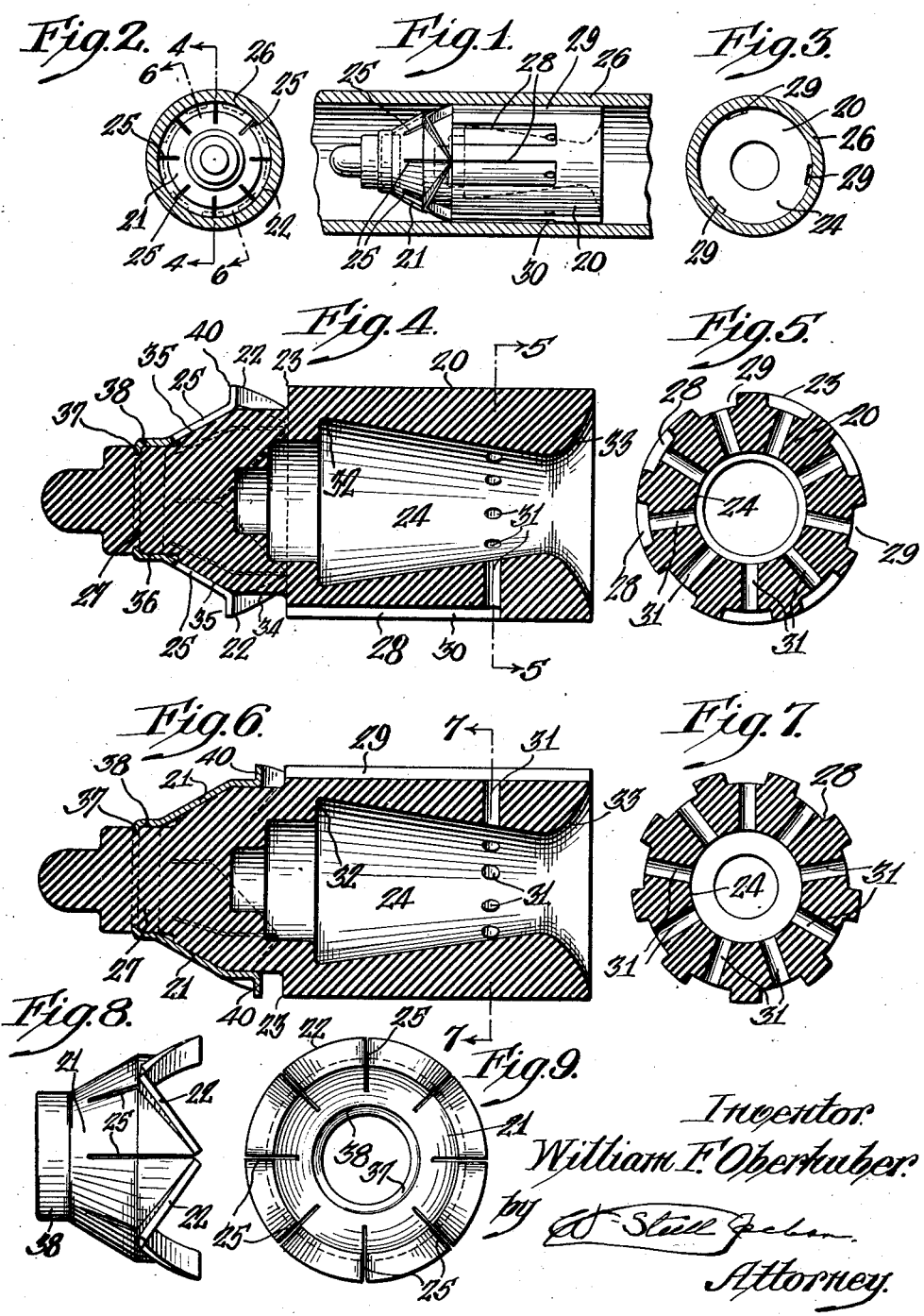

Dec. 8, 1931.   W. F. OBERHUBER   1,835,238
CONDENSER SLUG
Filed March 10, 1930   2 Sheets-Sheet 2
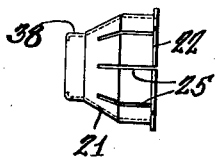
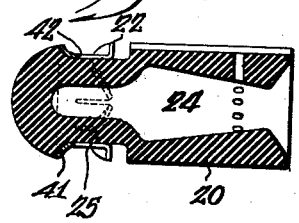
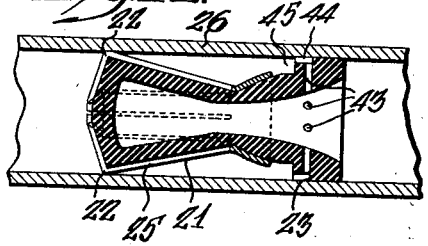
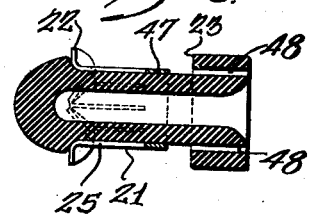
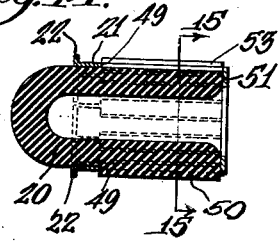
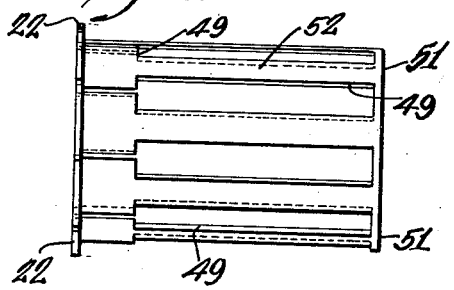
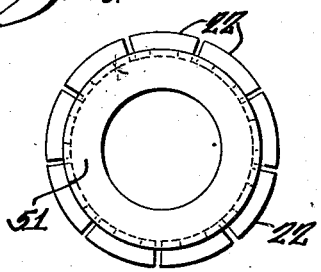
Inventor
William F. Oberhuber
by
Attorney Patented Dec. 8, 1931

1,835,238

UNITED STATES PATENT OFFICE

WILLIAM F. OBERHUBER, OF DREXEL HILL, PENNSYLVANIA, ASSIGNOR TO FRANKLIN DEVELOPMENT COMPANY, OF PHILADELPHIA, PENNSYLVANIA, A CORPORATION OF PENNSYLVANIA

CONDENSER SLUG

Application filed March 10, 1930. Serial No. 434,712.

My invention relates to composite slugs for use in cleaning condenser tubes and the like and has more particular reference to a slug having a rubber body hollow for a considerable portion of its length from its rearward end and mounting a metal scraper along a portion of its length, the driving fluid for slugs of this type being usually water or air.

A purpose of my invention is to provide a composite slug of the character indicated that is easy and inexpensive to manufacture and well suited to the needs of service.

A further purpose is to mount a sheet metal scraper along a portion of the length of a rubber slug that is hollow for a portion of its length from its rearward end.

A further purpose is to surround a rearwardly hollow rubber slug with a sheet metal member extending outwardly at one end to provide a circumferential scraping surface, and longitudinally split for a portion of its length from its scraping end to allow radial expansion.

A further purpose is to use the radial expansion of a rearwardly hollow rubber slug incident to the pressure exerted by driving fluid within the interior of the slug to resiliently press circumferential surfaces of a metal member surrounding the slug radially outwardly against the tube through which the composite slug is driving.

A further purpose is to provide a rubber slug having a forwardly directed arcuate cleaning surface of rubber with a circumferentially extending sheet metal scraper forwardly of the said rubber surface, forming the rubber to admit a considerable portion of the driving fluid against the rearward side of the scraper.

A further purpose is to longitudinally split the scraping end of a sheet metal scraper mounted on a rearwardly hollow plug in order to make the scraper radially resilient at its scraping surface, preferably splitting the scraping member for a portion of its length at circumferentially spaced intervals.

A further purpose is to provide a rubber slug of the character indicated with optionally different forms of piston scrapers mounted along a portion of the length of the slug and any one of which may be preferable according to circumstance.

A further purpose is to present metal scraping edges on a rubber slug forwardly of a rubber cleaning surface of the slug and at a considerable angle to the line of travel of the slug.

A further purpose is to provide a composite slug with forwardly directed metal scraping surfaces that zigzag circumferentially around the body of the slug and that preferably are resilient in a direction radial of the slug axis.

A further purpose is to combine a rubber slug with a sheet metal scraper in such a way as to adapt the scraper to simultaneously scrape the interior of a tube and to assist in pulling the slug along the tube.

A further purpose is to provide a metal scraper of the character indicated adapted to easy manufacture by die stamping process.

A further purpose is to mount a sheet metal member upon a forward nose of a rubber slug so that the forward portion of the member presses radially into the rubber and the metal fits the forward end as it extends rearwardly to flange outwardly at its rearward end to the interior surface of a tube.

Further purposes will appear in the specification and in the claims.

I have elected to show a few only of the many different forms of my invention, selecting forms that are practical and efficient in operation and which well illustrate the principles involved.

Figure 1 is a fragmentary sectional view showing a condenser tube carrying a composite slug embodying a desirable form of my invention.

Figure 2 is a left end elevation of Figure 1.

Figure 3 is a right end elevation of Figure 1.

Figure 4 is a section to enlarged scale of Figure 2 taken upon the line 4—4 thereof.

Figure 5 is a section of Figure 4 taken upon the line 5—5 thereof.

Figure 6 is an enlarged section of Figure 2 taken upon the line 6—6 thereof.

Figure 7 is a section of Figure 6 taken upon the line 7—7 thereof.

Figures 8 and 9 are respectively side and right end elevations of a detail that embodies an important feature of the form of my invention shown in the earlier figures.

Figure 10 is a view corresponding to Figure 8 but showing a different form from that of Figure 8.

Figures 11 to 14 inclusive are longitudinal sections of composite slugs embodying different forms of my invention, Figure 14 comprising a section taken upon the line 14—14 of Figure 15.

Figure 15 is a section of Figure 14 taken upon the line 15—15 thereof.

Figures 16 and 17 are side and end elevations of a detail of Figures 14 and 15.

Like numerals refer to like parts in all figures.

Describing in illustration and not in limitation and referring to the drawings:—

Broadly my invention includes a combination between a rearwardly hollow rubber slug 20 and a sheet metal scraper 21 surrounding the slug.

The scraper presents a circumferential scraping surface 22 forwardly of a rubber cleaning surface 23 presented by the rubber body of the slug.

The material and form of the metal scraper may be quite widely variant. I prefer to manufacture it by die stamping of sheet bronze or like material and for this reason have shown only forms adapted to easy manufacture by die stamping.

The rubber slug is hollow at 24 from its rearward end for a considerable portion of its length which results in lessened longitudinal compression stresses along the cleaning portion of the rubber body and also makes the radial expansion of the rubber body incident to the driving pressure within its interior produce a more firm resilient engagement between the metal scraper and the interior of the tube through which the composite slug is being driven by the high pressure fluid.

The scraper is preferably adapted to resilient expansion at its scraping surface in a direction radial with respect to the axis of the slug and in the illustrated embodiments of my invention this has been accomplished by providing the scraper with one or more longitudinal slits 25 from the scraping end of the scraper for an adequate portion of the scraper length.

Optionally one of these slits may extend the full length of the scraper but more desirably the slits are for a portion only of the length of the scraper which has a continuous body around its other end.

The scraper in effect comprises a sheet radial flange interlocking with the rubber of the body which is formed or perforated to admit a considerable portion of the driving fluid, usually air or water, to the back of the piston.

When the composite slug is driving through a tube 26 the piston may in practice actually forwardly pull the cleaning portion of the rubber slug although it is probable that the portion of the rubber body rearward of the scraper is more usually under some longitudinal compression, a compression however much less than would be the case were it not for the fact that a considerable portion of the driving energy is exerted at the rearward side of the scraper.

Describing first the embodiment of my invention shown in Figures 1 to 9, the rubber body 20 carries the sheet metal scraper 21 upon a forwardly directed nose 27 of the body.

The rearwardly hollow rubber body is externally fluted at 28 rearwardly of the nose, some of the flutes 29 desirably extending to the rear end of the body while others as 30 end at some little distance forward of the rearward end.

Except for the fluting the outside surface of the rubber body is cylindrical rearward of the nose 27 and the cleaning or polishing edges 23 are presented at the forward ends of the ribs between the flutes and also at the rearward ends of the flutes 30 that do not extend the full length of the slug body.

The driving fluid makes contact with the rearward side of the scraper through suitable perforations 31 from the interior of the body into the flutes and also through such flutes as extend all the way to the rear end of the plug.

When air is used to drive the composite slug through the condenser tube the perforations 31 may usually be omitted, the flutes 29 usually providing sufficient conduit connection to the piston scraper with air as the driving fluid.

The hollow of the plug preferably has its greatest sectional area near the forward end of the main portion of the slug, as at 32 and also is preferably provided with a rearward flare at 33 near its rearward end.

In Figures 1 to 9 the scraper 21 comprises a sheet metal ferrule closely fitting successive surfaces 34, 35 and 36 of the nose and presenting at its forward end a flange 37 that extends radially into the rubber in order to more firmly hold the scraper from inadvertent separation from the rubber body.

The nose of the rubber body comprises step sections progressively smaller toward the front, the forwardmost and smallest portion being used when mounting the plug to pull the next section into the corresponding cybest seen in Figure 4 thereby providing a radial longitudinal interlocking between the nose and ferrule.

The scraper is thus removably but strongly held to the slug by the circumferential compression of the rubber at the inward flange 37.

When a slug is driven through a tube 26 the forces acting upon it comprise driving forces effective across the area of the tube to force the slug along through the tube and resisting forces acting along circumferential surface or surfaces of the slug that engage the inside of the tube.

The total driving force upon the slug is equal to the sectional area of the tube multiplied by the difference between the fluid pressure back of the slug and that ahead of the slug.

In the hollow slug shown in Figure 4 the maximum interior cross-sectional area is approximately one-half the sectional area of the tube.

The rearward end of the scraper flanges radially outward at 40 to a diameter adapting it to engage the interior of the tube and longitudinal slits 25 from its scraping end make the scraping portions of the slug radially resilient.

Preferably the scraping flange 40 zigzags around the circumference as best seen in Figures 8 and 9 and in this event the longitudinal slits for providing radial resilience may desirably extend from the apices of the zigzag.

As illustrated in Figure 10 the zigzags may optionally be omitted but I usually prefer to make the scraping edges 22 at an angle with the longitudinal movement of the slug through the tube, the scraping action being then more effective.

The desirability of making the scraping edges at an angle with the line of movement may be determined by the character of deposit that is to be removed from the tube and also by other considerations such as the relative ease and expense of manufacturing the two forms.

In the form of Figures 1 to 10 the scraper has a rearward flare for a considerable portion of its length. This is not necessary and as illustrated in Figure 11 the flanges may be outward at both ends of the scraper.

In the form of Figure 11 the interior hollow 24 extends through the length of the scraper in order to provide a very considerable radial force upon the scraper from the interior of the plug during its passage through the tube.

It will be seen that the scraper is continuous at 41 around one end, and the other end from the scraping edges is provided with suitable slits 25 from its scraping end that adapt the scraping end to easy radial expansion responsive to the interior swelling of the slug during its driving travel through a tube.

In the form shown in Figure 12 the scraping edge at 22 is at the forward end of the composite slug, and also near the forward end of the scraper, the scraper having a circumferentially continuous portion 41' at its rearward end, shown forwardly converging.

The split portion of the scraper diverges forwardly from near the rearward end of the scraper to the scraping surface 22 after which it again sharply converges at 42 to case and support the forward end of the hollow rubber body.

The rubber body has its greatest interior area near its forward end and its minimum area toward the rearward end of the scraper.

The perforations 43 connect the hollow interior of the rubber body with the rearward end of flutes 44 which are circumferentially spaced around the outside of the scrubbing portion of the rubber body, the flutes ending forwardly in the space 45 back of the scraper and beginning at the perforations 43 near the rearward end of the plug.

The cleaning surfaces 23 presented by the rubber body are at the forward ends of the ridges between the flutes and at the rearward end of the flutes, together including the whole circumference of the slug.

The radial inward extensions 42 at the front of the scraper prevent danger of rupture at the front of the rubber body incident to the driving pressure within the plug.

It will be understood that in the form of Figure 12 the driving force upon the scraper is received both from the driving fluid in the external space 45 intermediate the rubber and metal cleaning surfaces and at 42 from the interior of the slug through the end wall of the rubber body.

In the form shown in Figure 13 the scraper comprises a sheet metal cylinder continuous at 47 around its rearward end and flanging outward at 22 at its forward end to engage the interior of the tube.

The entry of driving fluid to the piston scraper is shown as taking place through longitudinal perforations 48.

In the form shown in Figures 14 to 17 the scraper 21 is mounted upon the rearward end of the slug, the sheet metal body of the scraper being cut away at 49 to pass the ribs 50 of the fluted section of the rubber and the forward scraping portion 22 of the scraper being connected with the radially-inwardly extending rearward flange 51 by strips of metal 52 in the bottom of the flutes.

The driving fluid finds access to the front of the flutes and to the back of the flange 22 through the flute portion 53 not filled by the strips 52.

It will be seen that in all the forms shown the hollow from the rearward end of the rubber body results in a great reduction in the longitudinal compression of the body of the plug.

It will be seen that in all the forms shown the rubber body is hollow from its rearward end for a considerable portion of its length which materially assists in obtaining resilient expansion of the scraper surface against the interior of the tube, as well as avoiding disadvantageously high compression stress in the cleaning portion of the rubber body, during its passage through the tube; that the scraper includes a sheet metal member mounted upon the rearwardly hollow rubber slug; and this member is radially resilient at its scraping surface which preferably zigzags around the circumference of the tube in order to effect an engagement between the tube interior and scraping edge at an angle with respect to the relative movement between these members.

In the form shown in my drawings, and particularly in the form shown in Figures 1-9, I have indicated that the pressure of the driving medium, communicated through the resilient wall of the slug body, will tend to cause the scraper to radially extend into closer contact with the inner wall of the condenser tube. Since my slug is made of resilient material, as for example soft rubber, I may desirably form the portion of the slug tube intended to fit within the scraper of a somewhat larger size than the interior of the scraper, so that when the scraper is fitted on the slug the adjacent portion of the slug body will be contracted radially inward, and will constantly exert a radially extending pressure outward against the scraper. By this means the scraper will be caused to press against the inner wall of the condenser tube independently of any pressure due to the driving medium. Therefore in this form I may, although somewhat less desirably, use a slug in which part or all of the body interior is solid, but in which the hollow interior chamber of the body shall not extend within the scraper.

I have also shown the different scraper members all provided with one or more longitudinal slits from the scraping end.

These slits permit radial expansion against the tube and also provide for an escape of driving fluid out these slits sufficient to carry away the material scraped free from the surface of the tube.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In a composite slug for cleaning condenser tubes or the like, a rubber body hollow for a portion of its length from its rearward end but closed at its front end and a radially resilient sheet metal scraper surrounding the body and having an arcuate cleaning surface for engagement with the interior of the tube.

2. In a composite slug for cleaning condenser tubes or the like, a rubber body hollow for a portion of its length from its rearward end but closed at its front end and a radially resilient sheet metal scraper surrounding the body and the hollow thereof and having an arcuate cleaning surface for engagement with the interior of the tube.

3. In a composite slug for cleaning condenser tubes or the like, a rubber body presenting an arcuate cleaning surface outwardly for engagement with the interior of the tube, a sheet metal scraper surrounding the body and presenting a scraping surface to the interior of the tube forwardly of the cleaning surface of the body, the body having a hollow forwardly from its rearward end adapting the pressure of the driving fluid within the hollow of the body to radially swell the body and to apply a considerable portion of the driving force to the slug toward the forward end thereof.

4. In a composite slug for cleaning condenser tubes or the like, a rubber body hollow from its rearward end for a portion of its length and a sheet metal scraper surrounding the body and having an edge adapted to engage the interior of the tube for scraping purposes and split from its edge for a portion of its length including an end thereof to adapt the scraper to radial expansion.

5. In a composite slug for cleaning condenser tubes or the like, a rubber body hollow from its rearward end for a portion of its length and a sheet metal scraper surrounding the body and having an end adapted to engage the interior of the tube for scraping purposes and split from its said end for a portion of its length to adapt the scraper to radial expansion.

6. In a composite slug for cleaning condenser tubes or the like, a rubber body hollow for a portion of its length from its rearward end, a sheet metal scraper split at circumferentially spaced intervals longitudinally from one edge for a portion of its length including an end and presenting its said edge outwardly so as to be adapted to engage the interior of the tube.

7. In a composite slug for cleaning condenser tubes or the like, a rubber body hollow for a portion of its length from its rearward end, a sheet metal scraper surrounding the body and having one end extending outwardly to resiliently engage the interior of the tube and zigzagging circumferentially along the line of engagement.

8. In a composite slug for cleaning condenser tubes or the like, a rubber body hollow for a portion of its length from its rearward end, a sheet metal scraper surrounding the body and having one end extending outwardly to resiliently engage the interior of the tube and zigzagging circumferentially along the line of engagement, the scraper having one or more splits for a portion of its length from its engaging surface.

9. In a composite slug for cleaning condenser tubes or the like, a rubber body hollow for a portion of its length from its rearward end, a sheet metal scraper surrounding the body and having a forwardly directed circumferentially zigzagging surface at one end of the scraper for engaging the interior of the tube and longitudinal splits for a portion of the length of the tube from the apices of the zigzag.

10. In a composite slug for cleaning condenser tubes or the like, a rubber body hollow for a portion of its length from its rearward end but closed at its front end and a sheet metal radially resilient scraper surrounding and longitudinally interlocking with the body of the scraper having at one end a forwardly directed surface adapted to be pressed into engagement with the interior of the tube by the pressure of the driving fluid within the hollow.

11. In a composite slug for cleaning condenser tubes or the like, a rubber body hollow for a portion of its length from its rearward end but closed at its front end, a sheet metal scraper having a longitudinal taper and surrounding the body and presenting its enlarged end in position to engage the interior of a tube.

12. In a composite slug for cleaning condenser tubes or the like, a rubber body hollow for a portion of its length from its rearward end but closed at its front end, a radially resilient sheet metal scraper surrounding the body and presenting an arcuate cleaning surface in position to engage the interior of the tube, and the body formed to admit a considerable portion of the driving fluid radially within the scraper.

13. In a composite slug for cleaning condenser tubes or the like, a rubber body hollow for a portion of its length from its rearward end but closed at its front end, a sheet metal scraper surrounding the body and having an outward flange at one end adapted to engage the interior of the tube.

14. In a composite slug for cleaning condenser tubes or the like, a rubber body hollow for a portion of its length from its rearward end, a sheet metal scraper surrounding the body and having an outward and circumferentially zigzagging flange at one end adapted to resiliently engage the interior of the tube, the scraper having a longitudinal slit from its flanged end for a portion of its length adapting the flange to radial expansion responsive to pressure of driving fluid within the hollow of the body.

15. In a composite slug for cleaning condenser tubes or the like, a rubber body hollow for a portion of its length from its rearward end, a sheet metal scraper surrounding the body and having an outward and circumferentially zigzagging flange at one end adapted to resiliently engage the interior of the tube, the scraper having longitudinal slits from the apices of the zigzags of the flange for a portion of the length of the scraper adapting the flanged end to resiliently expand responsive to the interior pressure of driving fluid within the hollow of the body.

16. In a composite slug for cleaning condenser tubes or the like, a rubber body hollow for a portion of its length from its rearward end and a radially resilient sheet metal scraper surrounding the body and having an arcuate cleaning surface for engagement with the interior of the tube, the scraper being of normal diameter smaller than the interior diameter of the tube and being expanded by engagement with the rubber of the slug.

17. In a composite slug for cleaning condenser tubes or the like, a rubber body having its forward end smaller than the diameter of the tube and a radial resilient sheet metal scraper surrounding this portion of the tube, normally smaller in diameter than the interior of the tube and expanded by the front end of the body for engagement with the tube.

18. In a composite slug for cleaning condenser tubes or the like, a rubber body hollow for a portion of its length from its rear end and smaller at its front end than the inside diameter of the tube and a radially resilient sheet metal scraper surrounding this front end of the body extending over a portion of the body which is hollow, normally smaller in diameter than the inside diameter of the tube and expanded into engagement with the tube by the rubber of the slug with or without the assistance of the expansion of the hollow part of the slug by the driving pressure.

19. In a composite slug for cleaning condenser tubes or the like, a rubber body hollow for a portion of its length from its rearward end and having openings from the hollow of the body to the circumference of the body at an intermediate point communicating with the front of the body to allow passage of driving medium through the hollow to the front of the rubber part of the slug when in the tube and a radially resilient sheet metal scraper mounted upon the front of the body approximately fitting the tubes adapted to be swelled outwardly by the driving fluid passing through these openings.

20. In a composite slug for cleaning condenser tubes or the like, a rubber body hollow for a portion of its length from its rearward end and having openings from the hollow of the body to the circumference of the body at an intermediate point communicating with the front of the body to allow passage or driving medium through the hollow to the front of the rubber part of the slug when in the tube, a radially resilient sheet metal scraper mounted upon the front of the body approximately fitting the tubes adapted to be swelled outwardly by the driving fluid passing through these openings and by the resilience of the rubber pressing outwardly upon the scraper.

21. In a composite slug for cleaning condenser tubes or the like, a rubber body hollow for a portion of its length from its rearward end and having openings from the hollow of the body to the circumference of the body at an intermediate point communicating with the front of the body to allow passage of driving medium through the hollow to the front of the rubber part of the slug when in the tube, a radially resilient sheet metal scraper mounted upon the front of the body approximately fitting the tubes adapted to be swelled outwardly by the driving fluid passing through these openings and by the swelling of the rubber by pressure of the driving fluid within the hollow part of the slug.

22. In a composite slug for cleaning condenser tubes or the like, a rubber body hollow for a portion of its length from its rearward end and having openings from the hollow of the body to the circumference of the body at an intermediate point communicating with the front of the body to allow passage of driving medium through the hollow to the front of the rubber part of the slug when in the tube, a radially resilient sheet metal scraper mounted upon the front of the body approximately fitting the tubes adapted to be swelled outwardly by the driving fluid passing through these openings and by the combined resilience of the rubber pressing the scraper outwardly and the added pressure given to the rubber by the driving fluid within the hollow of the rubber slug.

WILLIAM F. OBERHUBER.